Nov. 4, 1941.   G. H. HEDRICK   2,261,155
STABILIZER
Filed Nov. 9, 1938
Fig. 1.
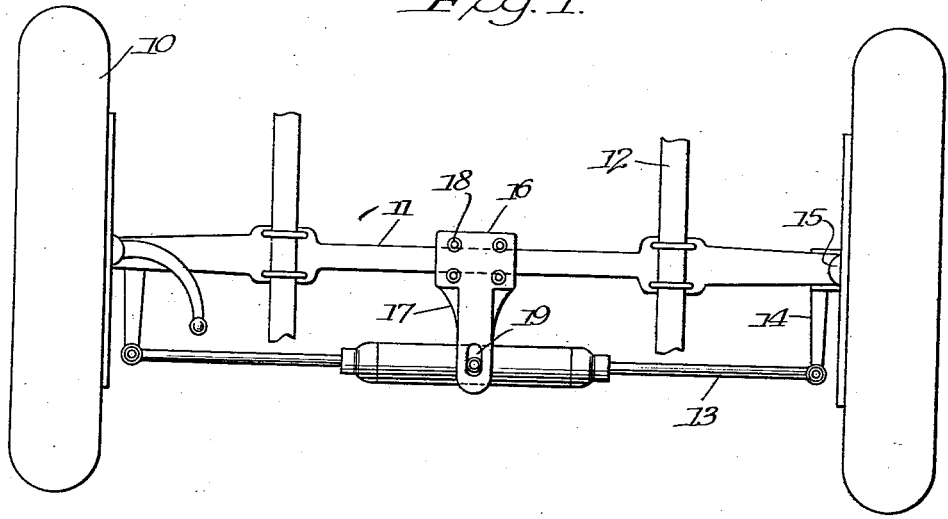
Fig. 2.
Fig. 3.
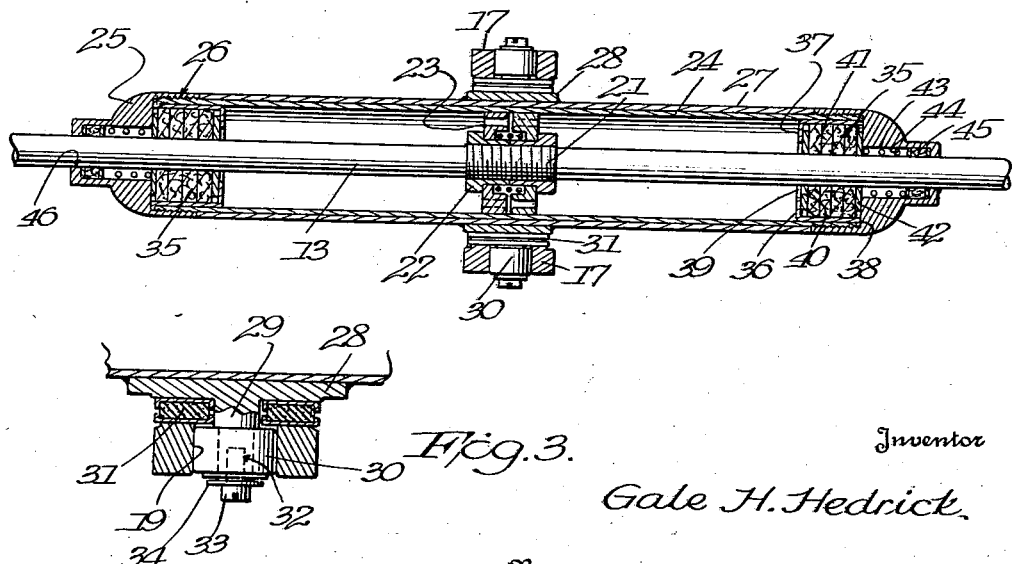
Inventor
Gale H. Hedrick.
By Cushman Darby & Cushman
Attorneys

UNITED STATES PATENT OFFICE 2,261,155

STABILIZER

Gale Holbrook Hedrick, Glenshaw, Pa., assignor to I. A. Simon, Pittsburgh, Pa.

Application November 9, 1938, Serial No. 239,713

3 Claims. (Cl. 280—90)

The present invention relates to stabilizers for vehicles, such as motor vehicles and aeroplanes.

The stabilizer of this invention is particularly useful in connection with the steering mechanism of the vehicle and embodies means whereby sudden shocks which tend to change the course of the vehicle are automatically controlled in a manner to maintain the vehicle in substantially its normal line of travel. Stabilizers of this general type are described and claimed in the patent to MacLellan, No. 2,058,384, granted October 20, 1936, upon which the present invention is an improvement.

I have found that very effective results are obtained which substantially add to the reliability of a device of this character if the pressure conditions upon each side of the piston head or valve are equalized. This result is attained by having the piston rod extend entirely through the working chamber and connected at its ends to the movable steering mechanism.

The present invention is capable of easy application to the usual motor vehicle or may be built into the same. Thus, the stabilizer may utilize the tie rod of the steering mechanism as the piston rod or the drag link may be employed as the piston rod. Also, a second rod may be connected to the steering mechanism to constitute the piston rod and, in fact, various means may be employed to provide a construction in which the piston rod extends entirely through the working chamber and is connected at its ends to movable members of the steering mechanism.

With a steering stabilizer constructed as above described, road shocks which tend to swerve the wheels are positively overcome instantly, by reason of the direct connection of the piston rod with the steering mechanism and the proximity of such connection to the location of the suddenly exerted force. In other words, a sudden force set up by the wheels encountering an obstacle which might wrest control from the driver is directly transferred from either side of the vehicle to the stabilizer, and instantaneously and completely compensated for, whereby the wheels are retained on their normal course.

In addition to the above advantages of having the forces directly translated, there is the further important advantage that wear upon the tie rod joints is reduced to a minimum. This result is attained by eliminating a joint or supplementary connection between the stabilizer and the tie rod and/or a joint between the stabilizer and a fixed part of the vehicle.

In carrying out the invention, the working cylinder is preferably maintained substantially stationary. That is, the chamber is held against transverse movement with respect to the vehicle but is allowed a limited longitudinal movement. The piston rod carrying the valve means is reciprocable within the cylinder and entirely therethrough, in accordance with the steering of the vehicle. This movement is instantaneously locked by valve means on the piston rod should the wheels encounter an obstacle setting up a sudden force tending to turn them from their normal course. The locking action of the valve is brief, and the presence of the stabilizer does not interfere with normal steering.

A further important feature of the invention resides in having the stabilizer working chamber positively supported substantially intermediate its ends on a stationary part of the vehicle as distinguished from suspending the device at its ends.

In the accompanying drawing, I have illustrated one embodiment of the invention as applied to the tie rod of a motor vehicle, such as a truck, it being understood, of course, that the device constitutes a very simple construction which may be readily installed upon or built into various other parts of the steering mechanism.

Referring to the drawing:

Figure 1 is a plan view,

Figure 2 is a longitudinal section,

Figure 3 is a detail section of the stabilizer support bearings.

Referring to Figure 1, I have indicated the wheels of the vehicle at 10, the axle at 11, and the frame at 12. The steering mechanism includes the tie rod 13 connected to the usual tie rod arms 14, and king pins 15. Substantially intermediate its ends, the axle is provided with a bracket construction 16 including a pair of arms 17 bolted to the upper and lower surfaces of the axle by means of the bolts 18.

Preferably, the arms 17 extend forwardly of the axle and are slotted as shown at 19 for a purpose which will later be described. The tie rod constituting the piston rod, at a point substantially intermediate its ends, is provided with a slightly enlarged threaded portion 21 receiving a quill nut construction 22 as shown in my copending application Serial No. 87,580, now Patent No. 2,151,850 of March 28, 1939, carrying a valve structure 23 having movable discs normally spring-pressed apart in accordance with the aforesaid MacLellan patent. Any other suitable valve means may be employed, and my invention is not to be limited to the valve means shown and described.

The valve members or discs 23 constitute the piston and are mounted on the piston rod for reciprocating movement within a working chamber or cylinder 24 preferably of steel enclosed at its ends by cap nuts 25 threaded upon the ends of the cylinder as shown at 26. A supplemental protective cylinder or suitable casing 27, likewise of steel closely fits and surrounds the inner cylinder 24, and at its ends abuts the adjacent ends of the cap nuts 25 to form suitable stops for the same. While I prefer to use a cylinder 27, this protective means may be a shorter metal strap or band if desired.

Substantially intermediate the ends of the outer cylinder there is welded or otherwise secured thereto a band or strap 28 having a pair of projections or pins 29 engaging in the elongated slots 19 respectively of the arms 17.

This construction allows limited longitudinal movement of the cylinder with respect to the vehicle during the steering of the vehicle while retaining the cylinder or working chamber in substantially fixed position. Referring to Figure 3, the projections 29 carry rollers 30 for engaging the walls of the slots 19 during the limited longitudinal movement of the cylinder, and suitable metal-bound flexible and resilient washers 31 are interposed between the surface of the band 28 and the adjacent surfaces of the bracket arms as shown. At their outer ends the projections 29 are provided with threaded counterbores 32 for receiving suitable studs or screws 33. These studs serve to hold suitable washers 34 in position to retain the rollers 30 against displacement.

There is disposed within the inner cylinder 24 a suitable hydraulic fluid, such as oil, and the ends of the cylinder or working chamber are sealed by a packing indicated as a whole at 35. This packing includes a metal cup-shaped retaining member 36 closely fitting the wall of the chamber to seal the same, and has an inwardly turned flange 37 within the cylinder, and an outwardly turned flange 38 which is engaged between an end of the cylinder and the adjacent wall of a cap nut whereby the retaining cup is held in position. At its inner end within the cylinder, the cup is provided with an enlarged opening 39 defined by the flange 37. The packing also comprises a metal plate or disc member 40 and suitable cushion packing members or discs 41 and a metal end plate 42 bearing against the adjacent wall of a cap member. The cap members are each recessed as shown at 43 and within the recess there is disposed a spring 44 bearing against the plate 42 on one side and against a suitable cushion packing 45 on the other side. It is to be noted that the outer ends of the cap members are provided with openings 46 of a diameter sufficient to permit the piston rod 13 to readily reciprocate therethrough. The packing just described allows the piston rod to readily reciprocate, but is of a character to thoroughly seal the cylinder and prevent the escape of the operating fluid. Compression of the cushion members 41 will serve to expand the same about the piston rod to seal the latter when a high pressure is developed in the cylinder and the cup member 36 affords an equally efficient seal at the wall of the chamber at all times.

In the operation of the invention, when an obstacle is encountered in the road producing a sudden shock which tends to wrest control of the vehicle from the hands of the driver or operator, the force is instantly translated to the valve mechanism which locks in the manner described in the aforesaid MacLellan patent, and movement of the tie rod is effectively prevented. This locking action is immediately released when an equal force is exerted in the opposite direction, but is resumed as frequently as shocks are encountered, as, for example, in the case of a blowout where the vehicle is traveling upon the deflated casing and rim.

While I have shown the invention as applied to an automobile with the tie rod acting as the piston rod, it is to be understood that a supplemental rod may be connected to the tie rod arms 14 or the stabilizer may be associated with the drag link in a similar manner or connected to other movable members of the steering mechanism. The construction provides for positively supporting the operating cylinder 24 in fixed position so that reliable operation is always assured. Furthermore, the stabilizer is directly connected to the steering mechanism in a manner to assure its instantaneous action under sudden impulses created by encountering obstacles in the roadway or other surface.

I claim:

1. A stabilizer for the steering mechanism of vehicles comprising a working chamber, a bracket for holding the same in substantially fixed position on a vehicle, pins on said chamber carrying rollers engaging in slots in said bracket, valve and piston means in said chamber, and a piston rod having means for connection to the steering mechanism and reciprocable entirely through the chamber, said piston rod carrying said valve means and said valve means being responsive to pressure within the chamber to lock the steering mechanism against movement.

2. A stabilizer for the steering mechanism of vehicles comprising a working chamber filled with hydraulic fluid, valve and piston means in said chamber, and a piston rod for said piston having means for connection to the steering mechanism, said rod being adapted to reciprocate through the chamber to drive said piston in response to the movement of the steering mechanism, said piston carrying said valve means and said valve means being responsive to the pressure of the hydraulic fluid against which said piston is moving to control the reciprocation of said piston to lock the steering mechanism against movement when said pressure is unduly increased, a packing means at the opening for the rod into the chamber, said packing means forming an end wall for the working chamber and comprising a metallic retaining member of cup-shaped form closely fitting the wall of the chamber and having a central opening at one end within the chamber substantially greater than the diameter of the piston rod and defined by an internal flange forming a retaining means at one end for a packing retained in said cup-shaped member, and a packing within said cup-shaped member and closely fitting the inner wall thereof, a cap member through which the piston rod reciprocates closing the end of the chamber and confining the packing at that end, said cup-shaped retaining member having a second flange adjacent the cap member and confined between the same and the chamber.

3. A stabilizer for the steering mechanism of vehicles comprising a working chamber filled with hydraulic fluid, valve and piston means in said chamber, and a piston rod for said piston having means for connection to the steering mechanism, said rod extending entirely through the chamber and having bearings for reciprocal movement in the opposite walls of said chamber, said piston carrying said valve means and said valve means being responsive to the pressure of the hydraulic fluid against which said piston is moving to control the reciprocation of said piston to lock the steering mechanism against movement when said pressure is unduly increased, a compressible packing means exposed to the pressure of the hydraulic fluid at each opening for the rod into the chamber, said packing means being normally provided to prevent leakage of said hydraulic fluid from said chamber but serving also to aid in the stabilizing function when said packing is compressed against the rod in the event that the valve means is closed while the piston is moving toward such packing means.

GALE HOLBROOK HEDRICK.